Figure 1:
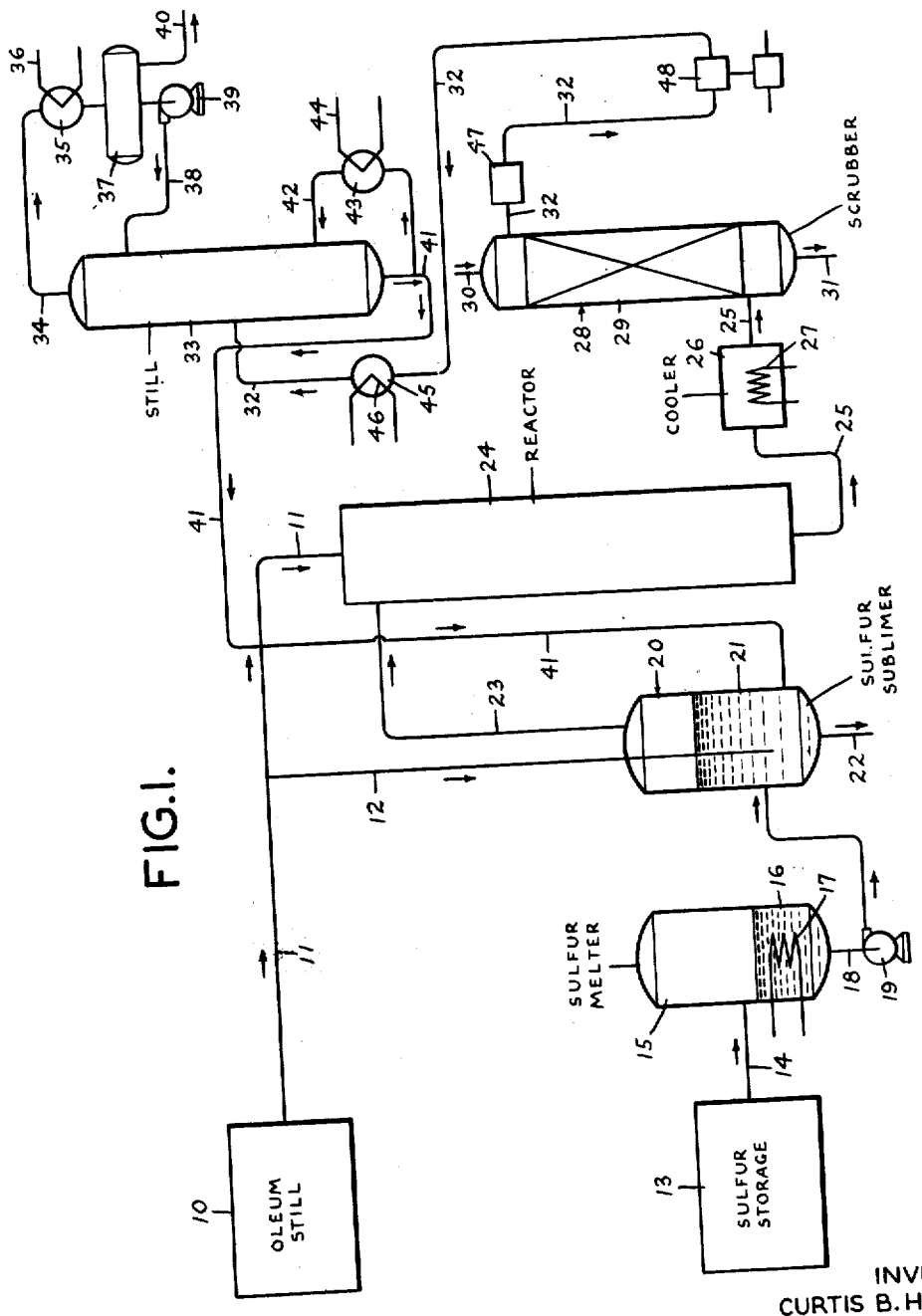

017
United States Patent Office 2,813,006
Patented Nov. 12, 1957

2,813,006

PRODUCTION OF SULFUR DIOXIDE FROM SULFUR AND SULFUR TRIOXIDE

Curtis B. Hayworth, Forest Hills, N. Y., and William E. Watson, Bernardsville, N. J., assignors to Allied Chemical & Dye Corporation, New York, N. Y., a corporation of New York Application August 12, 1953, Serial No. 373,785

5 Claims. (Cl. 23—177)

This invention relates to a method of production of sulfur dioxide, particularly to such production of the pure anhydrous liquid substance.

One object of the invention is a method of production of sulfur dioxide in concentrated form which is easily purified. A second object is a continuous method of producing the anhydrous liquid substance. A third object is simplicity of operation and control. A forth object is economy of operation and of equipment. Still other objects will be apparent from the following description.

The invention comprises a method of producing sulfur dioxide in concentrated form by reaction of sulfur trioxide and free sulfur. In its practice a charge stream of sulfur trioxide is contacted with molten sulfur for reaction therewith, preferably by admission into a body or pool of molten sulfur maintained at temperature at which excess or unreacted sulfur in the pool is vaporized into resultant sulfur dioxide product. Gaseous effluent from the body of sulfur, comprising concomitantly produced sulfur dioxide and vaporized free sulfur, is then passed to a reactor to which is also admitted additional sulfur trioxide charge. The quantity of additional sulfur trioxide charge, according to preferred practice of the invention, is substantially greater than that contacted with the body of sulfur, and is adequate to react with at least substantially all the vaporized sulfur admitted to the reactor. Temperature and other conditions maintained within the reactor are such that the added sulfur trioxide and vaporized sulfur therein react to produce additional sulfur dioxide. By preference the quantity of added sulfur trioxide admitted to the reactor is such as to effect complete consumption of the free sulfur charged thereto and to leave a slight excess of unreacted sulfur trioxide to produce as product of the reaction system an effluent containing for example 1%–5% by volume of sulfur trioxide.

The effluent from the reactor, which ordinarily is at least 95% by volume of desired sulfur dioxide, for example 95%–99% or somewhat higher, may be subjected to purification in any known or desired manner to remove sulfur trioxide contained therein, for example by scrubbing with sulfuric acid, by fractionation, or by combination of these steps.

In practice of the invention according to preferred modes of operation, free sulfur is admitted to a body or pool of this substance continuously and at rate adequate to maintain an excess of this substance in the body over that consumed by reaction with sulfur trioxide and that vaporized therefrom. The sulfur trioxide is admitted beneath the surface of that body. Upon its passage therethrough and its consumption in accordance with the exothermic reaction $2SO_3+S\rightarrow 3SO_2$, the heat liberated maintains the body at a temperature, preferably 650° F. or higher, at which a substantial quantity of the free sulfur present is vaporized or sublimed. By proper regulation of the conditions obtaining within the body, the quantity of sulfur vaporized and carried out in the sulfur dioxide exiting therefrom may be greater than, for example 2 to 5 times the amount consumed by the reaction.

Hence by the preferred mode of operation, such sulfur-laden effluent before or during its passage through the reactor is contacted with an amount of added sulfur trioxide substantially greater than the quantity thereof admitted to the pool of sulfur, preferably at least twice the last named amount.

Added sulfur trioxide may be in vapor or liquid form as contacted with the free sulfur-laden sulfur dioxide effluent from the sublimer. Preferably however it is liquid when so contacted, being condensed for this purpose if necessary. Used in either form it may be mixed with the sulfur-laden gases entering or about to enter the reactor, or admitted to one or more points within the latter, as desired to control temperature therein and/or of reactor effluent. When the added sulfur trioxide is in vapor form, it is usually desirable to supplement its cooling effect by means of indirect or other heat exchange within the reactor; however when this substance is added in liquid form, as is preferred, its evaporation before and/or during the course of its consumption by the reaction absorbs the exothermic reaction heat released so as to permit low reactor and effluent temperatures and operation of the reactor within a range of temperatures for which low price construction materials are suitable. In fact operation in accordance with this aspect of the invention permits maintenance of reactor and reactor effluent temperatures which are below those obtaining within the first reaction vessel or sublimer, as for example, temperatures within the range of 600 to 650° F.

Figure 2:
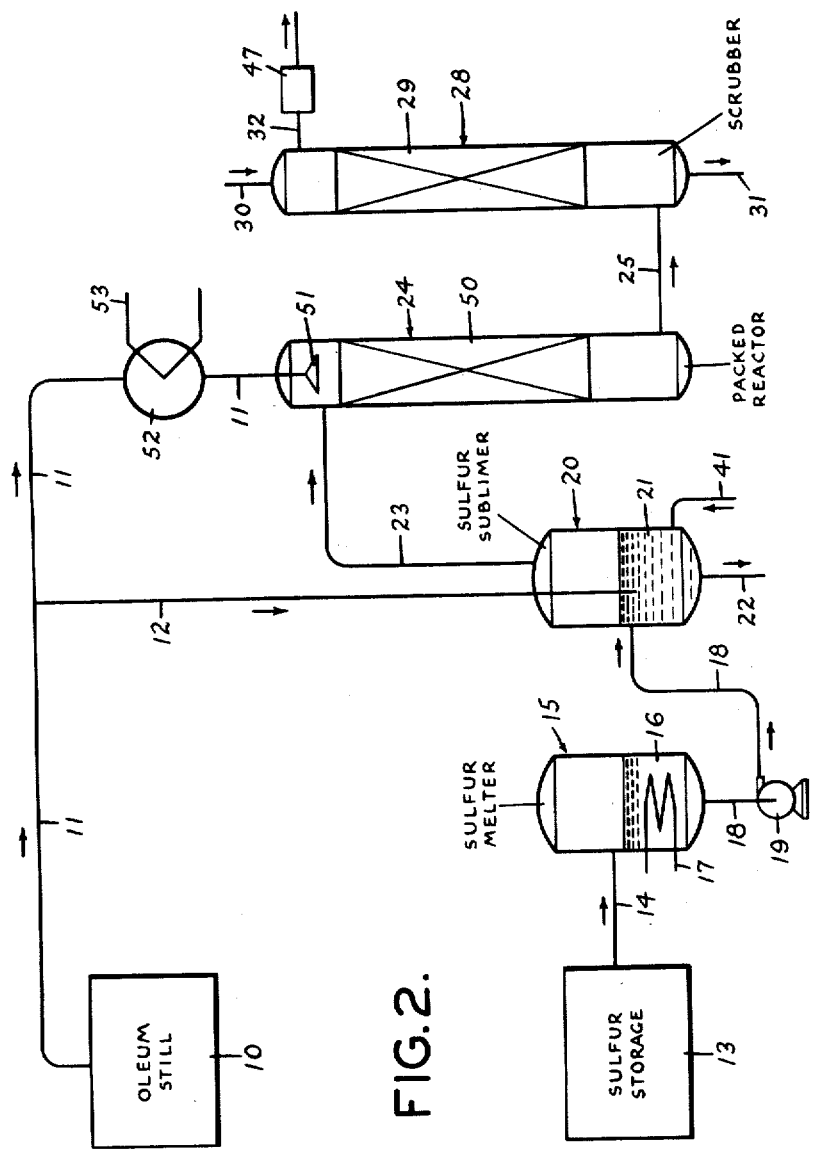

In the accompanying drawings, Figures 1 and 2 are flow diagrams of two concrete embodiments of the present invention.

In practice of the preferred modes of operation of this invention, as set forth in the drawings, sulfur feed is withdrawn from sulfur storage 13 and passed through line 14 to sulfur melter 15, where it is melted and heated to say 260° F. by steam coil 17. Molten sulfur is withdrawn from sulfur melter 15 through line 18 by means of pump 19 and passed to sulfur sublimer 20, wherein is maintained a pool or body 21 of liquid sulfur. Alternatively, solid sulfur may be admitted directly to the body of sulfur 21 in sublimer 20 to be directly melted by the heat present therein. In either event, sulfur is present in the sublimer in the liquid phase.

Sulfur trioxide may be prepared in oleum still 10 and withdrawn therefrom through line 11. A major portion, from 75% to 85%, say 82%, of this charge sulfur trioxide is passed directly to reactor 24, and a minor portion, from 25% to 15%, say 18%, is passed to sulfur sublimer 20. That portion of the charge sulfur trioxide passed through line 12 to the sublimer is preferably in the gas phase at temperature of 112° F. to 200° F., say 150° F., and if the charge in line 11 is in liquid phase, that portion withdrawn through line 12 may be evaporated or volatilized before admission to sublimer 20 or may be admitted thereto as liquid.

The sulfur trioxide passing through the molten pool of liquid sulfur in sulfur sublimer 20, reacts exothermically therein to form sulfur dioxide according to the equation: $2SO_3+S\rightarrow 3SO_2$. The sulfur trioxide gas passed through the sublimer and the heat of its reaction with the molten sulfur therein effects vaporization of the latter. Preferably incoming sulfur trioxide in line 12 is admitted below the surface of body 21 of sulfur, for example by means of suitable distributing devices such as bubble caps or the like to effect greater intimacy of contact therewith, thereby promoting the reaction within the liquid body proper. The percentage of the total charge sulfur trioxide passed to sublimer 20 will vary somewhat depending upon the temperature of the body of molten sulfur therein, which may be within the range of 260° F. to 830° F. preferably 650° F. At temperatures above that last named, which are maintained primarily by the exothermic heat of reaction, the rate of vaporization of free sulfur at preferred sublimer pressures which are atmospheric or slightly higher, is twice or more the rate of sulfur consumption by entering into the reaction itself. When maintaining such conditions in sublimer 20, the proportion of original sulfur trioxide charge which is mixed with sublimer effluent is substantially greater than that utilized to produce the latter. The ratio of sulfur trioxide charge admitted to the sublimer 20 to that admitted to reactor 24 is preferably controlled so as to be somewhat greater than the ratio of the rate of free sulfur evaporation to the rate of free sulfur consumption by reaction within the sublimer, the latter ratio at preferred sublimer temperature above 650° F. is at least 2:1.

Control of temperature of the sublimer and of its effluent in line 23 may be effected to minor extent by regulation of the temperature of charge sulfur trioxide in line 12. To this end, temperature in line 12 is 450° F. to 550° F., say 500° F. cooler than the temperature of sulfur pool 21. The hot effluent gases from the sub-sublimer in line 23 at a temperature of 650° F. contain 17% by volume of sulfur vapor; the remainder, say 83% by volume, may be substantially entirely surfur dioxide.

Thus, according to preferred practice, the major portion of the charge sulfur trioxide in line 11 is passed directly to reactor 24 at temperature of 112° F. to 200° F., say 150° F. as shown in Figure 1. Here it reacts with the sulfur admitted through line 23 to produce effluent in line 25 containing from 95% to 99% sulfur dioxide by volume and from 1% to 5% sulfur trioxide by volume. Also, in being heated to reaction temperature it absorbs part of the exothermic reaction heat and cools the reactor to some extent. The reactor may be additionally cooled in any desired manner to regulate internal and discharge temperature. If no additional cooling is employed, temperature of effluent in line 25 may be as high as 1200° F.–1275° F. Pressure in reactor 24 is preferably atmospheric or slightly higher. In preferred operation, due to the presence in the reactor feed line of up to 5% excess sulfur trioxide over free sulfur, some sulfur trioxide will remain unreacted and reactor effluent is sulfur-free.

Alternatively the gaseous sulfur trioxide in line 11 at temperature of 112° F. to 200° F., say 150° F., may be condensed in heat exchanger 52, cooled by coolant in line 53, as shown in detail in Figure 2, before being passed to reactor 24, which may contain packing 50. If charge sulfur trioxide in line 11 is in liquid phase at temperature of 80° F. to 120° F., say 100° F., that portion of it passed to reactor 24 may be directly admitted thereto, i. e. heat exchanger 52 may be by-passed, or a much smaller exchanger may be substituted therefor to control the temperature of the liquid feed.

The liquid sulfur trioxide employed in this embodiment, may be admitted to reactor 24 through line 11 and liquid inlet 51 proximate to the point of introduction of the sulfur-bearing stream in line 23, or at any other point or points consistent with maintenance of desired temperature conditions within the reactor. Preferably it is sprayed into reactor 24 at the upper end thereof through nozzle 51. It will vaporize at least in part as it enters reactor 24 and possibly in part during its travel therethrough in contact with the sulfur-bearing stream and the heat of the reaction: $2SO_3 + S \rightarrow 3SO_2$ is in part absorbed by the vaporizing liquid sulfur trioxide.

The admitted liquid sulfur trioxide may only exist as liquid momentarily or for a short period within reactor 24, the major portion of the reaction therein being in gas phase. If the quantity of liquid sulfur trioxide so admitted is equivalent to or slightly in excess of that required to react with the sublimed sulfur, satisfactorily low reaction and effluent temperatures of 590° F. to 630° F., say 610° F. are realized in the absence of additional cooling. Such temperatures may be below that of the sulfur laden entrance gas. However, additional cooling may be used if desired.

Reactor effluent in line 25 preferably containing from 95% to 99% of sulfur dioxide, and 1% to 5% sulfur trioxide, may be purified by scrubbing or distillation or any combination thereof. If the temperature in line 25 is high, e. g. 1200° F. to 1300° F., say 1275° F., as for example in the embodiment shown in Figure 1, the reactor effluent may be cooled as by coolant 27 in exchanger 26 to a temperature of 100° F. to 650° F., say 600° F. If the temperature in line 25 is lower, e. g. 590° F. to 630° F., say 610° F., as for example in the embodiment shown in Figure 2, cooler 26 may be eliminated.

In either event the effluent is passed through line 25 to scrubber 29 wherein it is contacted counter-currently with cooled sulfuric acid, preferably of 98%–99% concentration and at an inlet temperature of 100° F. to 200° F., say 150° F., in line 30. The sulfuric acid absorbs most of the sulfur trioxide present in the otherwise pure gas and simultaneously cools the gas.

Scrubber overhead gas, ordinarily containing less than 0.1% sulfur trioxide by weight may be withdrawn through line 32 and passed through filter 47 wherein entrained sulfuric acid may be removed. Sulfuric acid-free gas now preferably containing less than 0.1% sulfur trioxide by weight may be compressed in compressor 48, and may be passed further through line 32, condenser 45 cooled by heat exchange fluid in line 46, and then to still 33 as shown in detail in Figure 1. The crude sulfur dioxide-containing product may be here rectified to produce substantially anhydrous sulfur dioxide in overhead line 34, which is condensed in condenser 35, cooled by heat exchange medium in line 36. Pure liquid anhydrous sulfur dioxide product of purity of at least 99.999% by weight, may be collected in vessel 37, and a portion thereof may be withdrawn through line 38 and return to still 33 as reflux through pump 39. Net product may be withdrawn through line 40. Bottoms from still 33 may be withdrawn through line 41, and a portion thereof may be recycled through line 42 and reboiler 43, heated by heating medium in line 44, and then returned to the lower portion of still 33. Bottoms in line 41 are principally sulfur trioxide which may continuously or periodically be recycled to sublimer 20 or other portions of the system.

Whereas this invention has been particularly described with reference to two alternative methods of operation, it will be apparent to those skilled-in-the-art that certain features of each may be combined or interchanged and that other modifications may be made in the described operation which come within the scope of this invention.

For example, although the invention is described specifically as involving reaction between initial sulfur trioxide charge and original free sulfur when the latter is disposed as a body or pool, this step may be performed within suitable tubular or other reaction equipment within which no accumulated body or pool is formed and to which the initial charge substances are admitted at appropriate rate. Also, although it is preferred to utilize sulfur trioxide charge and its reaction with charge sulfur as the heat source in producing the desired sulfur vapor admitted to the reactor when the latter is cooled by vaporization of liquid sulfur trioxide, the sulfur vapor may be produced by any desired method including simple heating with or without the aid of diluent gases. Then the entire liquid sulfur trioxide charge is available for and may be used for control of reactor and/or reactor effluent temperature.

We claim:

1. The method of producing sulfur dioxide in concentrated form by the exothermic reaction $S+2SO_3 \rightarrow 3SO_2$ which comprises maintaining a charge stream of substantially pure sulfur trioxide, separating said stream into a minor portion and a major portion, maintaining a pool of molten sulfur in a first zone, introducing said minor portion of sulfur trioxide into said pool, thereby effecting said exothermic reaction within said pool, maintaining said pool entirely by the heat of said reaction at temperature of 650° to 830° F., thereby effecting solely by the heat of the reaction vaporization of free sulfur from the pool and producing an effluent gas containing sulfur dioxide and vaporized free sulfur, reacting in a second zone said effluent gas with said major portion of charge stream, and controlling the separation of charge stream into minor and major portions as aforesaid so that the quantity of the major portion is at least substantially stoichiometrically equivalent to the quantity of sulfur in said effluent gas.

2. The method of producing sulfur dioxide in concentrated form by the exothermic reaction $S+2SO_3 \rightarrow 3SO_2$ which comprises maintaining a charge stream of substantially pure sulfur trioxide, separating said stream into a first portion comprising 15% to 25% thereof and a second portion comprising the remainder, maintaining a pool of molten sulfur in a first zone, introducing said first portion of sulfur trioxide into the pool, thereby effecting said exothermic reaction within said pool entirely, maintaining said pool by the heat of said reaction at temperature of 650° to 830° F., thereby effecting solely by the heat of the reaction vaporization of free sulfur from the pool and producing an effluent gas containing sulfur dioxide and vaporized free sulfur, reacting in a second zone said effluent gas with said second portion of charge stream, and controlling the separation of said charge stream into first and second portions as aforesaid so that the quantity of said second portion is at least stoichiometrically equivalent to the quantity of sulfur in said effluent gas.

3. The method claimed in claim 2 wherein said second portion of sulfur trioxide is in the liquid phase as added.

4. The method claimed in claim 3 wherein said first portion of sulfur trioxide is at a temperature of 112° to 200° F. as added.

5. The method of claim 1 wherein said major portion of sulfur trioxide is in the liquid phase as added.

References Cited in the file of this patent

UNITED STATES PATENTS

| | | |
|---|---|---|
| 1,896,483 | Dohse | Feb. 7, 1933 |
| 2,156,791 | Mohr | May 2, 1939 |
| 2,726,933 | Merriam et al. | Dec. 13, 1955 |

FOREIGN PATENTS

| | | |
|---|---|---|
| 627,848 | Great Britain | July 24, 1946 |

U. S. DEPARTMENT OF COMMERCE
PATENT OFFICE

CERTIFICATE OF CORRECTION

Patent No. 2,813,006                                                  November 12, 1957

Curtis B. Hayworth et al.

It is hereby certified that error appears in the printed specification of the above numbered patent requiring correction and that the said Letters Patent should read as corrected below.

Column 5, lines 27 and 28, strike out "entirely"; same line 28, after "pool" insert -- entirely --.

Signed and sealed this 15th day of April 1958.

(SEAL)
Attest:

KARL H. AXLINE
Attesting Officer

ROBERT C. WATSON
                                                                                                            Commissioner of Patents